United States Patent [19]

Margalith

[11] Patent Number: 5,276,548
[45] Date of Patent: Jan. 4, 1994

[54] RING CAVITY OPTICAL PARAMETRIC APPARATUS

[76] Inventor: Eli Margalith, 434 Santa Cecelia, Solana Beach, Calif. 92075

[21] Appl. No.: 983,747

[22] Filed: Dec. 1, 1992

[51] Int. Cl.$^5$ .............................................. H03F 7/00
[52] U.S. Cl. .................................. 359/330; 372/20; 372/21; 372/22; 372/94; 372/99
[58] Field of Search ............... 359/325, 326, 327, 328; 372/20, 21, 22, 93, 94, 100, 99

[56] References Cited

U.S. PATENT DOCUMENTS

| | | | |
|---|---|---|---|
| 4,085,335 | 4/1978 | Guilino | 359/330 |
| 4,408,329 | 10/1983 | Ferguson | 372/21 |
| 5,017,806 | 5/1991 | Edelstein et al. | 359/330 |
| 5,033,057 | 7/1991 | Bosenberg | 372/72 |
| 5,034,951 | 7/1991 | Edelstein et al. | 372/22 |
| 5,047,668 | 9/1991 | Bosenberg | 359/330 |
| 5,053,641 | 10/1991 | Cheng | 359/330 |
| 5,079,445 | 1/1992 | Guyer | 359/330 |
| 5,134,622 | 7/1992 | Deacon | 372/21 |
| 5,177,633 | 1/1993 | Wong | 359/330 |
| 5,191,587 | 3/1993 | Hanson et al. | 372/21 |
| 5,206,868 | 4/1993 | Deacon | 372/21 |

Primary Examiner—Frank Gonzalez
Attorney, Agent, or Firm—Terry M. Gernstein

[57] ABSTRACT

An Optical Parametric Oscillator (OPO) includes optical elements located and oriented so a pump beam is generating an idler beam and a signal beam while all of these beams propagate in common directions at any given time as they move through the OPO. In one form of the invention, the optical elements include a dichroic mirror, a non-linear crystal, and right angle prisms. The beams are reflected by one of the right angle prisms back through the non-linear crystal so that walkoff is cancelled.

13 Claims, 3 Drawing Sheets

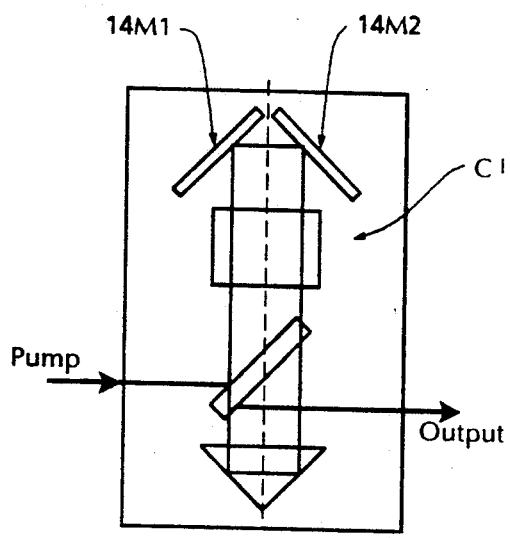
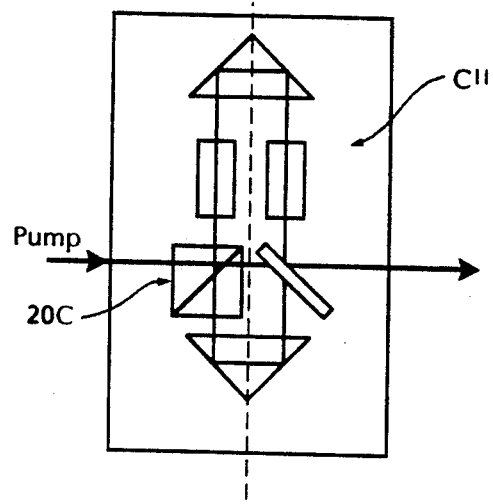
FIG. 4A
FIG. 4B
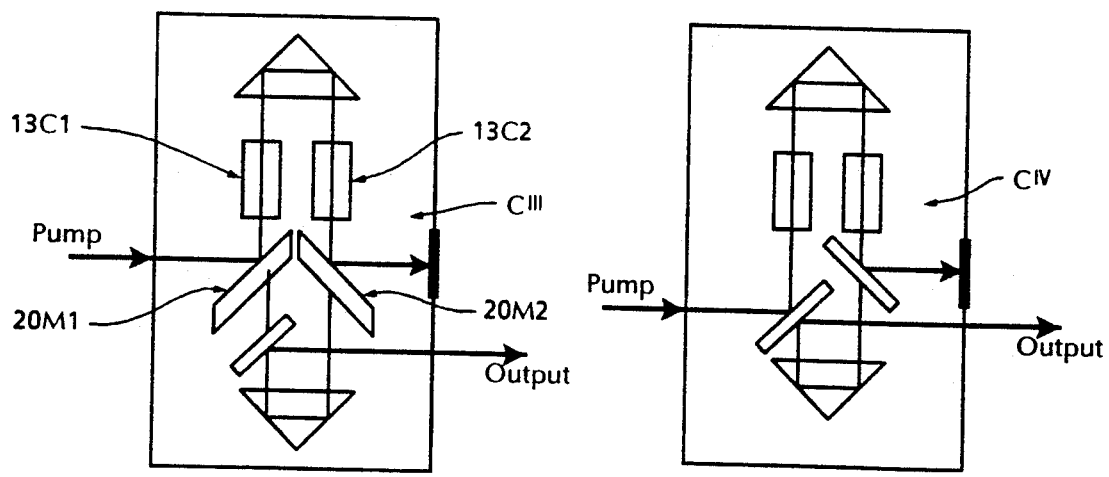
FIG. 4C
FIG. 4D

RING CAVITY OPTICAL PARAMETRIC APPARATUS

TECHNICAL FIELD OF THE INVENTION

The present invention relates to the general art of non-linear optical frequency conversion systems, and in particular to means for increasing the conversion efficiency of such systems.

BACKGROUND OF THE INVENTION

Optical parametric Oscillators (OPO) are passive, optical devices which convert a high intensity laser beam (pump) into two beams (signal and idler) having different wavelengths than the pump beam. In this technique, a laser beam is directed to pass through a non-linear optical crystal such as $BaBa_2O_4$, $LiB_3O_5$, $LiNbO_3$, $KTiOPO_4$, or the like. The interaction between the high intensity electrical field of the laser pump beam and the crystal results in conversion of the pump beam into two beams of different wavelengths (signal and idler) while preserving momentum and energy. The wavelengths of these beams can be tuned over a wide spectral range by varying the orientation of the crystal with respect to the laser beam, by changing the crystal's temperature, or by applying a variable voltage across the crystal. Various tuning ranges can be achieved by properly selecting the laser, the non-linear crystal and the optical components of the system.

Different constraints limit the practicality of presently available OPO designs. The high laser intensity required from the laser source to efficiently pump an OPO, can exceed the optical damage threshold of the non-linear crystal, or of the dielectric coatings of the various optical components within the cavity.

In linear cavities of the prior art, the pump beam traverses the cavity in one direction whereas the signal and the idler beams oscillate back and forth. However, the parametric process takes place only when the parametric beams (signal and idler) propagate in the same direction as the laser pump beam. This severely limits the efficiency of presently available systems. Another limitation with presently available systems is presented by the walkoff associated with the propagation of extraordinary beams in birefringent materials, such as the non-linear crystal used in the OPO. The walkoff can limit the effective gain length of the crystal, and therefore the conversion efficiency.

In critical phase-matching configurations, the beams which are generated by the non-linear process propagate with different polarization than the laser beam. The parametric gain length is defined as the length within the crystal along which the beams interact to stimulate gain. The walkoff that is associated with the propagation of beams with different polarizations within a birefringence material limits the effective gain length. The walkoff angle depends on the choice of non-linear crystal, the pump wavelength, and the geometric configuration (e.g., in Type I OPO in BBO this angle is in the range of 2-5 deg, and the effective gain length is limited to a few diameters of the pump beam).

A technique to increase the gain length by reducing the walkoff is disxclosed in U.S. Pat. Nos. 5,047,668 and 5,079,445. The walkoff compensation presented in these patents is achieved by placing two crystals with their optical axes opposing each other. However, the two crystals have to be rotated in a counter direction to each other with great mechanical precision in order to allow tuning.

Finally, the system efficiency is significantly impaired due to the Fresnel losses inside the cavity. Since the idler and the signal are tuned continuously over a wide spectral range, it is practically impossible to provide an Anti-Reflection (AR) coating that will reduce the surface reflection losses over a spectral range that will cover the pump, signal, and idler wavelengths.

These problems have to be resolved in order to build tunable laser systems which will be reliable and efficient, be easily tunable and adaptable to various uses. Therefore, there is a need for an OPO system that offers solutions to these problems and which can be operated with commercially available lasers, yet can be tuned over a wide spectral range without risking optical damage. Such a system should also be small and simple to align and operate. Such a system will close the gap between conceptual ideas and a useful and practical apparatus for research, medical applications and industrial applications.

OBJECTS OF THE INVENTION

It is a main object of the present invention to provide an OPO having an effective gain length that is significantly longer than presently available devices.

It is another object of the present invention to provide an OPO that is compact, reliable and easily tunable as compared to presently available devices.

It is another object of the present invention to provide an OPO that has walkoff essentially eliminated without requiring complex tuning and/or controls.

It is another object of the present invention to provide an OPO that is highly efficient and can be adapted to a wide variety of uses.

SUMMARY OF THE INVENTION

These, and other, objects are achieved by an optical parametric oscillator for converting a pump beam into a signal beam and an idler beam having a cavity that includes means for maintaining the signal and idler beams propagating in the same direction as the pump beam at all times the beams are in the cavity. This overcomes the above-discussed problems which limit performance of present OPOs without compromising the performance of such OPOs.

In other cavities, the pump beam traverses the non-linear crystal in one direction, whereas, the signal and idler beams are oscillating back and forth through the crystal. There- fore, in such cavities, the parametric photons spend half of their time travelling in opposite directions to the pump beam. During this time, they do not contribute to the parametric amplification.

The OPO of the present invention includes a ring oscillator which forces the parametric beams to propagate in a cyclic, unidirectional, path within the cavity. The signal and the idler beams are retro-reflected twice within the ring oscillator, in a direction which coincides with the direction of the pump beam (which is folded once by one of the retroreflectors). The parametric beams travel, during the entire process, in the same direction as the pump beam, and contribute continuously to the amplification. Therefore, the overall interaction time, or the effective gain length, is increased significantly over prior art devices.

The use of a mirror to reflect the undepleted pump back into the cavity in order to increase the interaction time, has been suggested in the prior art (see, e.g., U.S.

Pat. No. 5,079,445, and Brosnan, *Optical Parametric Oscillator Threshold and Linewidth Studies*, IEEE JQE Vol. 15, No. 6, June 1979). However, the residual laser beam in these systems is directed back into the pump laser. This presents a risk of damaging the laser and adversely affects the complexity of the device.

The typical pump laser for OPO applications emits its energy in a very short pulse. The short duration of the pulse limits the interaction time between the parametric beams (signal and idler) and the pump beam. Therefore, it is crucial that the overall length of the cavity be minimized in order to maximize this interaction time. The design of the presently-disclosed ring oscillator does not compromise the cavity length which is kept to a minimum. Forcing the signal and idler beams to propagate in the same direction as the pump beam without compromising the cavity length maximizes the optical conversion efficiency.

The OPO of the present invention can be used with a variety of wavelength tuning techniques. The OPO can be tuned by varying the temperature of the crystal, in a non-critical phase matching configuration. Limited tuning can be obtained by applying a variable voltage across the crystal. Wavelength tuning can be achieved in a critical phase-matching configurations by rotating the crystal (or pairs of crystals in alternative forms of the invention) with respect to the direction of the pump beam.

In critical phase-matching configurations, the walkoff, which results as beams of different polarization propagate through the crystal, can severely limit the effective gain length of the device. This problem is minimized in the present invention.

In the design embodying the present invention, the crystal is placed within the ring cavity to be traversed twice in each round trip of the parametric beams. The crystal is oriented in the cavity such that the walkoff generated in the first path is opposite in direction to the walkoff generated in the second path, and therefore the overall walkoff is cancelled as the pump traverses the crystal.

The system embodying the present invention further includes a dichroic beam splitter which injects the pump beam into the cavity. The beam splitter also reflects the output beam. The beam splitter is coated on one side to reflect the pump beam, and half of its other side is coated to partially reflect the parametric beams. Since this coating is not exposed to the intense pump beam, it can be designed to cover a very wide tuning range without risking optical damage (e.g., in the case of BBO pumped at 355 nm, one mirror can provide continuous tunability over the entire visible range).

Another advantage offered by the present invention is the option to design the cavity in order to minimize the Fresnel losses at the surfaces of the optical elements within the OPO. The crystal and the prisms can be cut at an angle that will allow "p" polarized beams to enter these elements at a Brewster angle. E. G., in Type I, the pump beam can enter the optical elements as an "s" polarized beam; whereas, the parametric beams will be "p" polarized with respect to the optical surfaces. The surfaces traversed by the beams can be coated with an Anti-Reflection coating in order to minimize the losses of the fixed pump wavelength. Both the idler and the signal will suffer minimal Fresnel losses at the Brester cut surfaces even at large tuning angles.

The design of the present invention is very simple to implement as it includes very few parts, and the alignment requirements are minimal. The device of the present invention is robust and inexpensive (relative to known devices) and still is able to serve a wide variety of purposes and practical uses.

The spectral linewidth of other forms of the presently disclosed OPO can be controlled by incorporating a variety of optical elements within the cavity. Optical elements such as prisms, refraction gratings, and etalons, can be used separately or in conjunction with one another, to narrow the spectral linewidth of the signal or the idler. Narrow line output can also be achieved by injecting into the oscillator a spectrally narrow beam, at the wavelength of the signal or the idler.

BRIEF DESCRIPTION OF THE DRAWING FIGURES

FIGS. 4A–4D illustrate alternative forms of the cavity of the present invention.

DETAILED DESCRIPTION OF THE PREFERRED EMBODIMENT OF THE INVENTION

The parametric process takes place when all three beams are propagating within the crystal approximately along the same path, in the same direction.

The ring oscillator of the present invention forces unidirectional propagation of the parametric beams. The parametric photons travel, during the entire process, in the direction of the pump beam, and continuously contribute to the amplification. In the present invention, the signal (and/or idler) beam is retroreflected twice within a ring oscillator. The parametric beams are folded by corner reflectors (a right angle prism, or any combination of optical components which will reflect the beams in a direction parallel to their original direction). The beam(s) propagate in a single direction within the crystals. This direction coincides with the direction of the pump beam which is folded once within the cavity by one of the retroreflectors. Therefore, the overall interaction time (or the effective gain length) is increased significantly. The design does not compromise the cavity length which is kept to a minimum. Forcing the signal and idler beams to propagate in the same direction as the pump beam without compromising the cavity length maximizes the optical conversion efficiency.

Tunability is achieved by varying the temperature of the crystal, by applying variable voltage or by rotating the crystal (or pairs of crystals) with respect to the direction of the pump beam, in a manner similar to known linear cavity designs.

Figure 1:
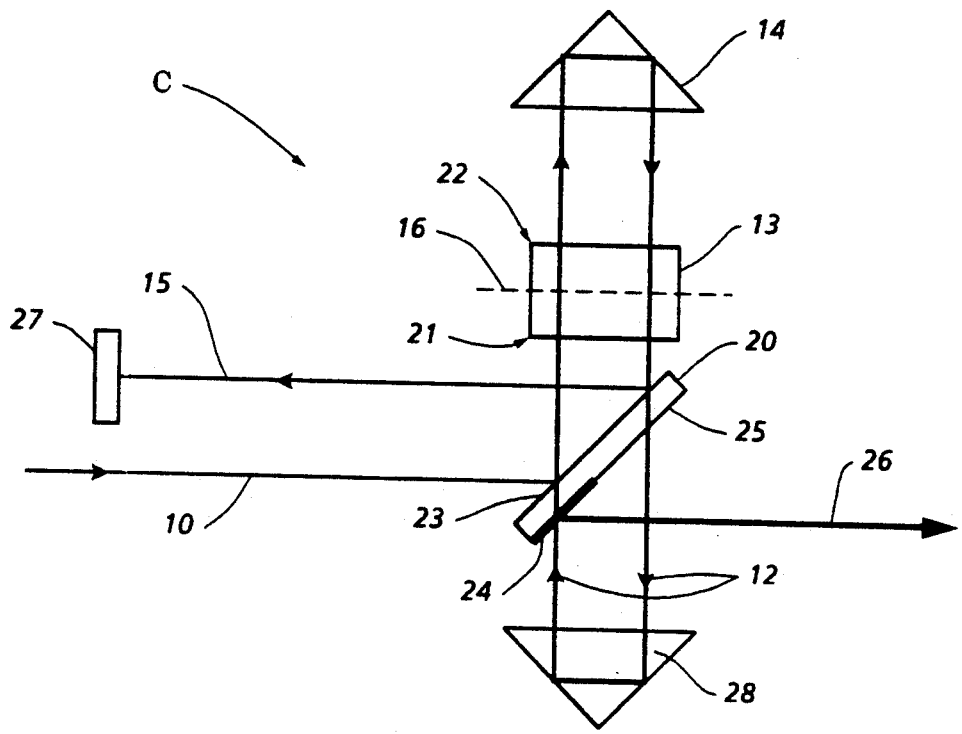
FIG. 1 is a diagrammatic view of a unidirectional ring cavity.

Shown in FIG. 1 is a unidirectional OPO cavity C. In cavity C, pump beam 10 and parametric beams 12 are always propagating in the same direction as each other as these beams move through the cavity. Even if the beams are turned, they are turned together whereby all beams propagate in a common direction at any one time during the process.

Specifically, cavity C includes two right angle prisms 14 and 28 that are oriented to face each other to form a ring oscillator shaped in the form of a rectangle. A non-linear crystal 13 is placed between the two prisms 14 and 28, and is traversed twice, in each round trip, by the parametric beams.

Pump beam 10 enters the OPO and is reflected by a dichroic mirror 20 to propagate through crystal 13. The mirror serves as a beam splitter, and has three different coatings that will be described below. One coating, surface 23, reflects the pump beam and is coated for maximum reflection (that is, a reflection factor of greater than or equal to 85% and preferably greater than 85%) at the pump wavelength while allowing minimum losses at the wavelengths of the idler and/or signal beams. Half of opposite surface, surface 25, is left uncoated or is coated for maximum transmission (that is, a transmission factor of equal to or greater than 85%, and preferably greater than 85%) over the spectral range of interest of the parametric beams. The second half of the same surface, surface 24, is coated to partially reflect over the spectral range of the desired output wavelengths. The oscillator can be designed as a Single Resonance Oscillator (SRO) for either one of the parametric beams (e.g., the oscillator can be designed to oscillate the idler. In this case, all the coatings will be designed for minimal losses at the idler wavelengths and surface 24 coated for optimum reflection over the spectral range of the signal beam). The device can also be designed as a Double Resonance Oscillator (DRO), and the optics coated accordingly.

Pump beam 10 enters the crystal at front surface 21 and is partially converted to two parametric beams, signal and idler, as it propagates through the crystal. All beams emerge from surface 22 of the crystal and are reflected back into the crystal by right angle prism 14. The edge connecting the apexes of the 90° right angle prism 14 is aligned perpendicular to the direction of the pump beam. In this orientation, the reflected beams propagate parallel to the original direction of the pump beam. The residual pump beam is reflected out of the OPO cavity by the same surface 23 that directed it into the cavity; whereas, the signal and idler beams are transmitted through both surfaces 23 and 25 of beam splitter 20. Residual pump beam 15 exits the device, or is blocked by a beam stopper 27.

After passing through beam splitter 20, the parametric beams 12 are retro-reflected again by the second prism 28. The signal (and/or idler) beam is partially reflected out of the cavity by the surface 24 of beam splitter 20, as output 26 of the OPO. The rest of the beam(s) propagate through the beam splitter and reenter the crystal, at face 21, along the original path of the pump beam. The oscillator formed by the two retroreflectors 14 and 28, is a closed loop, unidirectional, ring oscillator.

The output wavelength can be tuned by a variety of techniques that affect the indexes of refraction of the crystal, in order to provide phase-matching conditions. Non-critical phase-matching can be obtained by varying the temperature of the crystal. The wavelength of the output can also be controlled by applying a variable voltage across the crystal.

Wavelength tuning, in a critical phase matching configuration, is achieved by rotating the crystal (or pairs of crystals) with respect to the direction of the laser beam, in a manner similar to known linear cavity designs. A type I phase matching configuration is presented in FIGS. 2A and 2B, as a simple case, in order to explain the crystal orientation which is required to provide tunability and walkoff compensation.

Figure 2A:
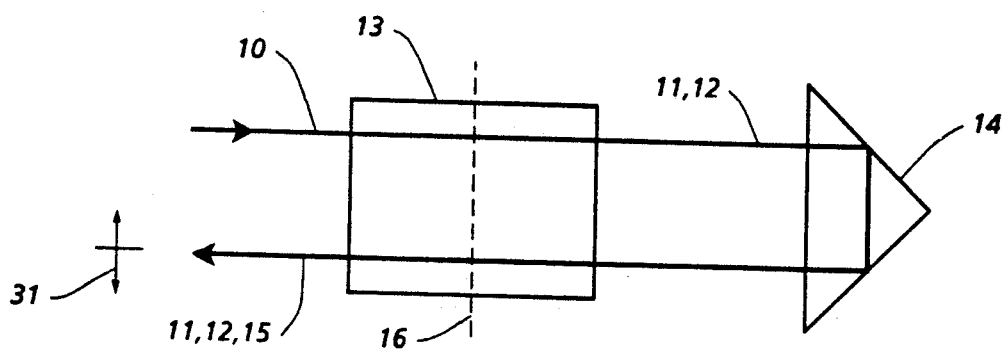
FIG. 2A and 2B are top and side diagrammatic illustrations of a folded OPO cavity, which includes means for compensating for walkoff.
Figure 2B:
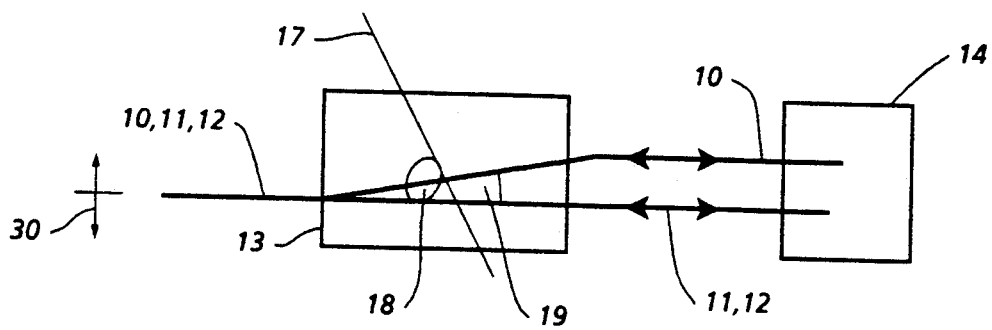

The pump beam 10 shown in FIGS. 2A and 2B is linearly polarized and enters crystal 13 as an extraordinary beam. Optical axis 17 of the crystal resides on the same plane as the polarization vector 30 of the pump beam and is orientated at an angle 18 to the direction of the beam. Being an extraordinary beam, the pump beam exhibits a walkoff angle 19 (side view FIG. 2B) which is determined by the pump wavelength, the birefringence of the non-linear crystal, and the relative angle between the optical axis and the polarization vector 30. The signal I1 and idler 12 beams are generated in the parametric process as ordinary beams. Their polarization vectors 31 reside on the plane that contains the oscillating beams ("cavity plane") and are not subjected to walkoff. The separation of the energy waves due to the walkoff angle limits the effective interaction ("gain") length.

In this configuration, the walkoff takes place in a plane perpendicular to the cavity plane. Therefore, the walkoff is reversed as the pump beam is reflected back by the retro-reflector 14 and propagates through the crystal 13 in the opposite direction. Therefore, the overall walkoff is cancelled as the pump traverses the crystal, and the gain length is effectively doubled.

Wavelength tunability of the signal (and the idler) beam is achieved by rotating the crystal with respect to an axis 16 which is perpendicular to the optical axis and parallel to the OPO cavity plane.

Figure 3:
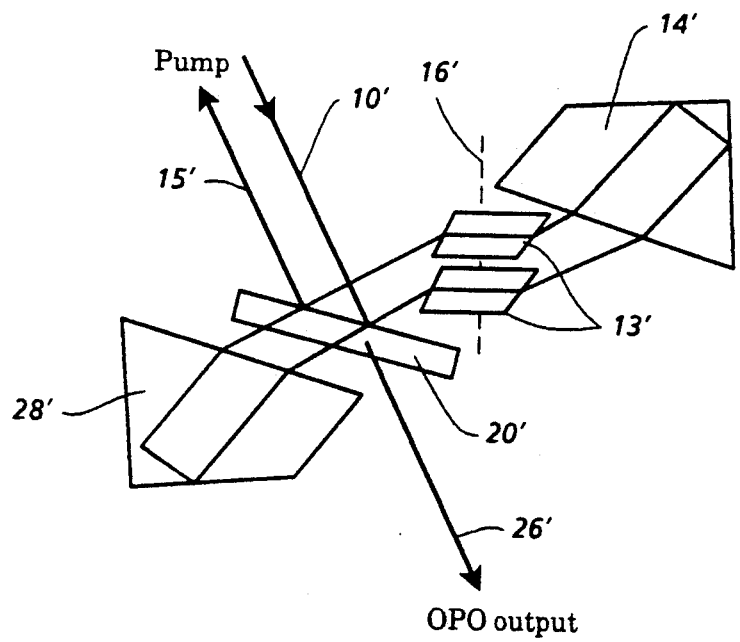
FIG. 3 is a view of a ring cavity similar to the one presented in FIG. 1, except that the crystals and the prisms are cut at Brewster angles to the direction of propagation of the beams.

The reflection losses within the cavity can be minimized by rearranging the optical components, as shown in FIG. 3. The pump beam 10' enters the cavity after being reflected by the dichroic beam splitter 20', and the ring oscillator is formed by two right angle prisms 14' and 28' (in a similar manner to that described with regard to FIG. 1). However, the non-linear crystals 13' and the right angle prisms 14' and 28' are cut at a Brewster angle with respect to the direction of the beams. The "p" polarized idler and signal beams suffer minimal losses as they interact with these optical surfaces. The surfaces of these elements can be Anti-Reflection (AR) coated to maximize the transmission of the fixed wavelength, "s" polarized pump beam.

Variations of the design presented in FIG. 1 are shown in FIGS. 4A–4D. System C' shown in FIG. 4A replaces the right angle prism 14 with two mirrors 14M1 and 14M2 that are oriented at a right angle with respect to each other. System C'', shown in FIG. 4B, replaces dichroic mirror 20 with a polarizing beam splitter cube 20C. The polarizing cube is aligned to reflect the s-polarized pump beam and transmit the p-polarized signal and idler beams. In system C''', shown in FIG. 4C, the crystal 13 is replaced by two identical smaller crystals 13C1 and 13C2. The two crystals can be mounted side-by-side and rotated together as a single unit. As is also shown in FIG. 4C, the dichroic mirror can be replaced by two mirrors 20M1 and 20M2. The system $C^{IV}$ shown in FIG. 4D has the output coupling mirror coated on a separate substrate and mounted separately if so required.

As can be understood from the foregoing, the design embodying the present invention cancels walkoff with a single rotational axis, has a high conversion efficiency while also having a short cavity with minimal overall dimensions. The design needs only minimal alignment, with only one prism needing the freedom to rotate in one axis (pitch) and translate in only one axis (perpendicular to the beams). Still further, the design of the present invention has a minimal number of components, is low cost and robust, yet can operate as a SRO or as a DRO as well as a variety of applications.

It is understood that while certain forms of the present invention have been illustrated and described herein, it is not to be limited to the specific forms or arrangements of parts described and shown.

I claim:

1. An optical parametric oscillator (OPO) for converting the output wavelength of a laser source into a signal wavelength and an idler wavelength comprising:
   a ring cavity into which a laser pump beam is directed to be converted into a signal beam and an idler beam having different wavelengths than the pump beam, said ring cavity including
   (1) a first mirror having a first surface reflective with respect to said pump wavelength and highly transmissive with respect to said signal and idler beam wavelengths, said pump beam being incident on said first surface,
   (2) a non-linear crystal means located to receive a reflected pump beam reflected by said first mirror, said crystal means converting said reflected pump wavelength into said signal and idler wavelengths, both said signal and idler beams propagating in a direction common to each other and common to said pump beam,
   (3) a first reflecting element located to have said pump, signal, and idler beams incident thereon, said first reflecting element re-directing said pump, signal and idler beams to propagate in a second common direction that is parallel to said first common direction, said first reflecting element being oriented and positioned so that said pump, idler and signal beams propagating in said second common direction are incident on said non-linear crystal means and on said first mirror, said pump beam being reflected away from said cavity by a front surface of said first mirror, said first mirror having a second surface having a transmissive portion that is highly transmissive to said signal and idler wavelengths, said signal and idler beams being transmitted through the transmissive portion of the second surface of said first mirror, and
   (4) a second reflecting element located to have said signal and idler beams incident thereon, said second reflecting element re-directing said signal and idler beams 180° to propagate in a third common direction that coincides with said pump beam direction and said first common direction, said second reflecting element being oriented and positioned so that said idler and signal beams propagating in said third common direction are incident on said first mirror, said first mirror having a portion of said second surface thereof that is partially reflective with respect to said signal and idler wavelengths, said portion of said second surface being located to have signal and idler beams reflected by said second reflecting element incident thereon.

2. The OPO defined in claim 1 wherein said first mirror is a dichroic mirror.

3. The OPO defined in claim 2 wherein said first reflecting element is a right angle prism.

4. The OPO defined in claim 3 further including a blocking element located and oriented to have any pump wavelength reflected by said first mirror from said second common direction incident thereon.

5. The OPO defined in claim 1 wherein said crystal means includes two crystal elements.

6. The OPO defined in claim 1 wherein said second reflecting element includes a right angle prism.

7. The OPO defined in claim 1 wherein said first mirror includes two mirror elements.

8. The OPO defined in claim 1 wherein said first mirror includes a polarizing beam splitter cube adjacent to a mirror element.

9. The OPO defined in claim 7 further including a third mirror element located adjacent to one of said two mirror elements.

10. The OPO defined in claim 1 further including means for varying the angle between the optical axis of said crystal and the direction of said pump beam for wavelength tuning.

11. The OPO defined in claim 1 further including means for changing the refraction indices by varying the temperature of said crystal for wavelength tuning.

12. The OPO defined in claim 1 further including means for changing the refraction indices by applying a variable voltage across said crystal for wavelength tuning.

13. An optical parametric oscillator (OPO) for converting the output wavelength of a laser source into a signal wavelength and an idler wavelength comprising:
   a ring cavity into which a laser pump beam is directed to be converted into a signal beam and an idler beam while preserving momentum and energy, said ring cavity including
   (1) a first mirror having a first portion that is highly reflective with respect to said pump wavelength, said pump wavelength being incident on said first portion of said first mirror,
   (2) a non-linear crystal means located to receive a reflected pump wavelength reflected by said first mirror, said crystal means converting said reflected pump wavelength into said signal and idler wavelengths both propagating in a direction common to each other and common to said pump wavelength,
   (3) a first reflecting element located to have said signal and idler wavelengths incident thereon, said first reflecting element re-directing said signal and idler beams 180° to propagate in a second common direction that is parallel to said first common direction, said fist reflecting element being oriented and positioned so that said idler and signal wavelengths propagating in said second common direction are incident on said non-linear crystal means and on said first mirror, said first mirror having a second portion that is highly transmissive to said signal and idler wavelengths and highly reflective of said pump wavelength, said idler and signal wavelengths being incident on said first mirror second portion, and
   (4) a second mirror having a first section thereof that is highly reflective with respect to said pump wavelength and a second section that is highly transmission with respect to said signal and idler wavelengths, said second section being located to have signal and idler wavelengths transmitted through said first mirror incident thereon.

* * * * *